Figure 1:
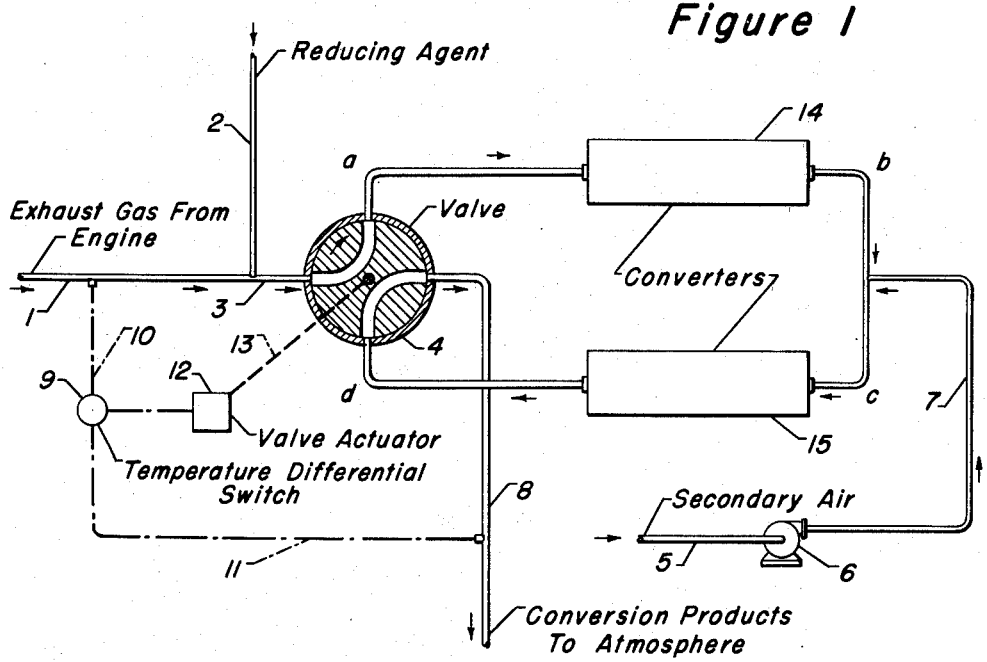

Jan. 8, 1963

H. S. BLOCH 3,072,457

METHOD OF CATALYTICALLY PURIFYING EXHAUST GASES
OF INTERNAL COMBUSTION ENGINES AND REGENERATING
THE LEAD-CONTAMINATED CATALYST

Filed May 31, 1960

2 Sheets-Sheet 1

INVENTORS:
Herman S. Bloch

BY: *Chester J. Giuliani*
*James R. Hoatson, Jr.*

ATTORNEYS

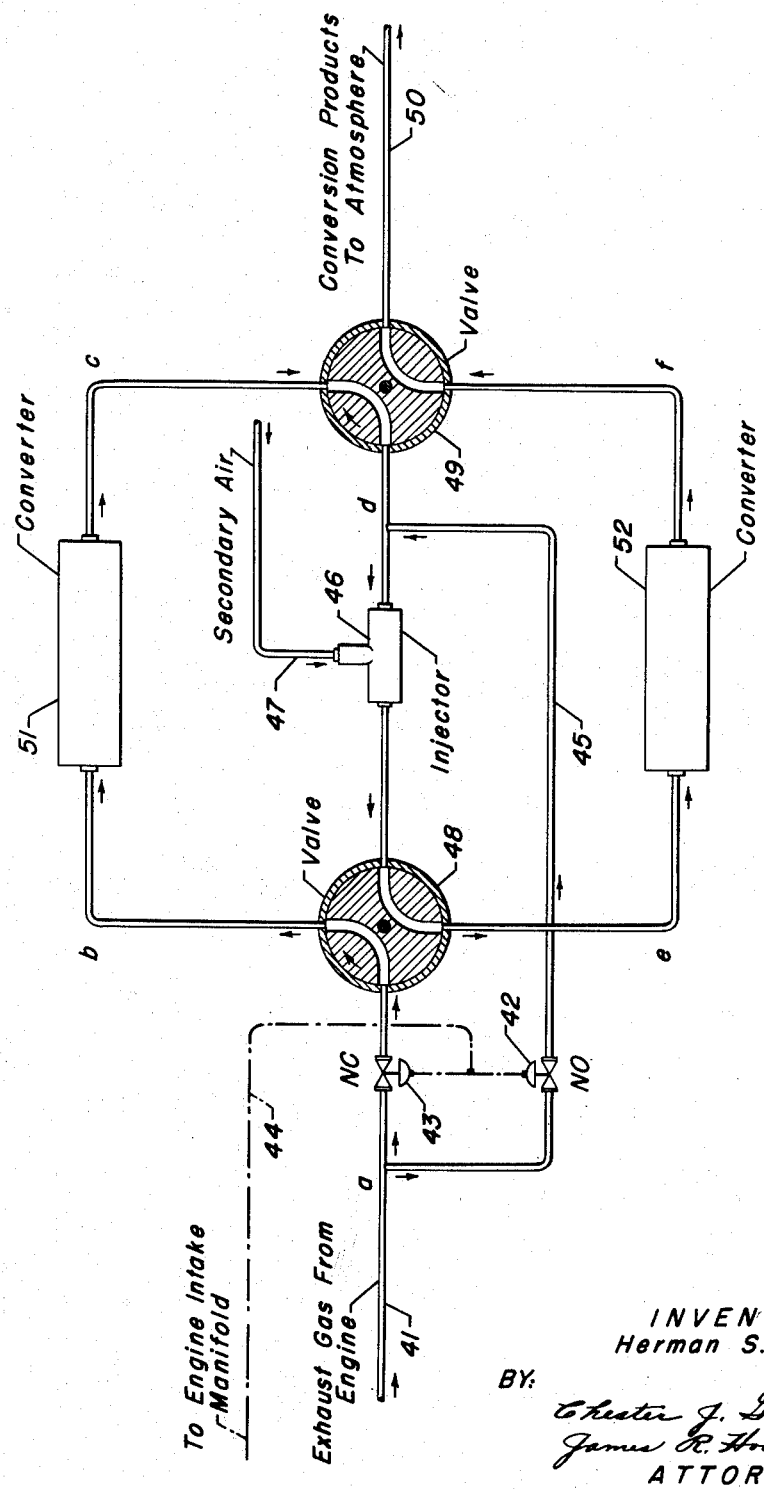

United States Patent Office 3,072,457
Patented Jan. 8, 1963

3,072,457
METHOD OF CATALYTICALLY PURIFYING EXHAUST GASES OF INTERNAL COMBUSTION ENGINES AND REGENERATING THE LEAD-CONTAMINATED CATALYST
Herman S. Bloch, Skokie, Ill., assignor to Universal Oil Products Company, Des Plaines, Ill., a corporation of Delaware
Filed May 31, 1960, Ser. No. 32,650
18 Claims. (Cl. 23—2)

The present invention relates to the regeneration or reactivation of catalytic contact masses which have become contaminated with lead as a consequence of exposure to contact with lead-containing waste products incident to the catalytic conversion of such waste products. In particular, the present invention concerns the regeneration of catalysts employed in the conversion of the exhaust gases emanating from an internal combustion engine using leaded fuel, and is further directed to a cyclic regenerative conversion process for effecting the continuous conversion of such exhaust gases.

It is now recognized that the elimination of certain components present in automotive exhaust gases is highly desirable and of prime importance in protecting the public health and welfare. The unavoidably incomplete combustion of hydrocarbon fuels by the gasoline or diesel engine results in the generation of substantial quantities of unburned hydrocarbons and other undesirable materials which, as waste products, are released to the atmosphere through the exhaust line. With the ever-increasing concentration of automobiles, particularly in urban areas, the discharge of such waste products into the atmosphere may reach significantly deleterious proportions. These combustion products are believed to react with atmospheric oxygen, under the influence of sunlight, to produce what is now commonly referred to as smog. Such combustion products include, by way of example, unsaturated hydrocarbons, partially oxidized hydrocarbons such as alcohols, ketones, aldehydes and acids, etc., carbon monoxide, and various oxides of nitrogen and sulfur. Although at least a portion of these compounds may be partially removed by chemical sorption media, the conversion of exhaust gas constituents by catalytic means is by far the preferred technique. The desired objective is to achieve substantially complete conversion of all of the unburned hydrocarbons, particularly the high molecular weight unsaturated hydrocarbons, and carbon monoxide, as well as the partially-oxidized hydrocarbons hereinabove set forth, into carbon dioxide and water prior to discharging the exhaust gases into the atmosphere. Gasoline powered internal combustion engines are a major but not the only source of atmospheric pollution; others include diesel engines, propane or butane engines, natural gas engines, fired heaters, flare stacks, and the like.

Catalytic means for improving waste products for discharge into the atmosphere, and particularly for the conversion of the hydrocarbonaceous combustion products contained within the exhaust gases emanating from an internal combustion engine, necessitate the use of a catalyst possessing an exceptionally high degree of activity, and particularly stability or capability of performing its intended function for an extended period of time. A wide variety of factors affect the stability of active catalytic composites, which factors are generally peculiar to the environment in which the catalyst is employed. In regard to catalysts for the conversion of hydrocarbonaceous combustion products emanating from an internal combustion engine, the actual operation of the engine must be considered. For example, such engine is commonly operated over a wide range of speed and load conditions and, therefore, the combustion efficiency thereof correspondingly varies; the space velocity and temperature of the exhaust gases, as well as the concentration of combustible material therein, likewise vary over wide limits. The catalyst should be capable of withstanding high temperatures of the order of 1600° F. to as high as 2000° F. without rapid thermal deactivation, and preferably should possess maximum activity at substantially lower temperatures. The catalyst should have a relatively low threshold-activation temperature in order that the conversion reactions be self-initiating within a minimum time following startup from relatively cold conditions. In general, it is desirable that the catalyst be satisfactorily active at temperatures within the range of about 200° F. to about 2000° F.

The catalyst is usually disposed as a confined particle-form bed disposed in a suitable container or catalytic converter which is installed in the engine exhaust line. The catalytic converter may be of the through-flow, cross-flow, or radial-flow design and, in the case of vehicular applications, may supplant or be combined with the usual acoustic muffler. In the majority of systems, secondary or combustion air is injected upstream of the catalytic conversion zone, usually by means of an aspirator or by external compressor means.

Although a great many potentially good, high activity catalysts have been developed which perform well even under the aforesaid adverse conditions, such catalysts are nevertheless deleteriously affected by lead and lead compounds which are present as vapors or as entrained solids in the exhaust gases resulting from the combustion of a leaded fuel. The majority of motor fuels, including some fuels for marine engines, contain tetraethyl lead or equivalent lead compounds as an additive for increasing the anti-knock efficiency of the engine in which the fuel is consumed. A typical commercial tetraethyl lead additive contains, in addition, approximately 2 gram-atoms of chlorine and 1 gram-atom of bromine, usually as ethylene dihalide, per gram-atom of lead, which is thus 1.5 times the stoichiometric quantity of halogen required to form the lead dihalide; in conventional terminology, the tetraethyl lead additive is said to contain 1.5 "theories" of halogen. The halogen serves as a scavenging agent to prevent buildup of lead deposits on spark plugs and engine cylinder walls by preferentially converting the lead tetraethyl, under the elevated cylinder temperatures prevailing during combustion, to highly volatile lead halides, for example, to lead chloride and lead bromide or to the oxyhalides of lead; minor quantities of lead do not react with halogen and are converted instead to less volatile lead oxides. The major proportion of these lead compounds are discharged, as vapors or fines, into the exhaust line along with the exhaust gases. When the resulting lead-contaminated exhaust gases pass into contact with the exhaust gas conversion catalyst, the stability of the catalyst is substantially impaired, which phenomenon is demonstrated by the fact that the catalyst deactivation rate is very much greater than when unleaded fuel is employed.

On its face, this result would appear quite anomalous since most of the lead enters the conversion zone as a halide, and the normal catalyst bed temperature is in the range of 500° F. to 1600° F. whereby such halide is readily volatilized, whence one would expect the lead halide to pass completely through the bed with as much facility as it escaped deposition upon the engine cylinder walls and exhaust manifold structure. Such, however, is not the case. Although various theories have been proposed to explain the deactivation of catalysts by lead, it appears that the principal mechanism by which catalyst poisoning or deactivation occurs is one of chemical reaction between the volatile lead compounds and the catalyst base whereby to yield a stable, relatively nonvolatile lead compound-catalyst base complex which plugs the pores of the catalyst and/or forms a mono-molecular film of complex over the entire micro-structure of the catalyst; evidence favors the latter theory because, in most instances, physical measurements of spent lead-contaminated catalyst reveal no appreciable reduction in surface area or pore volume as against those of the fresh catalyst. By catalyst base is meant a refractory inorganic oxide carrier or support, preferably of medium to high surface area, with which one or more catalytically active metals are composited. Typical bases include, for example, alumina, titania, silica, alumina-silica, alumina-zirconia, alumina-silica-zirconia, and the like. The deactivation of the catalyst is believed to proceed via the following reactions which are exemplary but not exhaustive of the several interactions of lead compounds with catalyst bases:

(1) $MeOH + PbX_2 \rightleftharpoons MeOPbX + HX$
(2) $MeOH + MeOPbX \rightleftharpoons MeOPbOMe + HX$
(3) $MeOPbX + H_2O \rightleftharpoons MeOPbOH + HX$
(4) $Me_2O + PbX_2 + H_2O \rightleftharpoons (MeO)_2Pb + 2HX$ where Me represents an equivalent of a metallic component of the catalyst base, e.g., Al, Zr, Ti, etc. and X is a halogen, for example, chlorine, bromine or iodine. Water, in the vapor or superheated vapor state, enters into reactions (3) and (4), supra, which water is inevitably present in hydrocarbon combustion products. When the catalyst accumulates an average lead content within the range of 5% to 30% by weight, and, more commonly, 10% to 25% by weight, which may occur after anywhere from 1000 to 20,000 road miles of operation, depending upon the presence or absence of catalyst guard media, average space velocity, concentration of lead in the fuel, physical and/or chemical properties of the catalyst, and various other factors, the hydrocarbon and carbon monoxide conversion activities of the catalyst have usually fallen to such a low value as to preclude continued use, and such lead-contaminated catalyst must therefore be replaced with fresh catalyst or regenerated in situ.

The instant invention has for its principal objective a method of regenerating a lead-contaminated catalyst, and is founded upon the discovery that the conversion activity of such spent catalyst may be substantially restored by contacting it with a reducing atmosphere such as hydrogen, carbon monoxide, hydrocarbons, partially-oxidized hydrocarbons, mixtures of two or more of these, and the like. A great advantage of this method resides in the fact that the exhaust gas of an internal combustion engine may itself be employed, in whole or in part, as the regenerating medium, whereupon the catalyst may be regenerated in situ; furthermore, various single or multiple-bed flow systems may be utilized to advantage in providing continuous, cyclic regenerative conversion of lead-containing exhaust gases, as exemplified in the drawings and hereinafter described.

Experimental data have shown that when a catalyst is exposed to contact with a preponderance of plumbiferous gases, the lead content of the catalyst eventually stabilizes at an equilibrium level, usually in the range of 10% to about 25% by weight of lead, in a manner somewhat analogous to the deposition of coke upon cracking catalyst with the resultant attainment of "equilibrium" catalyst. The precise effect of the reducing atmosphere upon a lead compound-catalyst base complex is not known; it is established, however, that improved catalytic activity and any substanial degree of lead removal are not necessarily concomitant. For this reason it is believed that the reducing atmosphere converts the several lead compound-catalyst base complexes to a form or forms of lead, perhaps to metallic lead, which exert a substantially lessened deactivating effect upon the catalyst. While in some instances it is possible to accomplish more or less complete removal of lead from the catalyst by practice of this invention, it should be emphasized that such lead removal is not necessary to the successful utilization thereof. The instant method is, of course, applicable to regeneration in situ and to external regeneration.

A general embodiment of this invention provides a method of regenerating a lead-contaminated catalyst which comprises subjecting said catalyst to contact with a reducing gas, preferably at an elevated temperature within the range of about 200° F. to about 2000° F.

A more specific embodiment of the present invention relates to an improvement in the catalytic conversion of lead-containing exhaust gases emanating from an internal combustion engine using leaded fuel including the steps of admixing secondary air with said exhaust gases and subjecting the resultant mixture to contact with a lead-sensitive conversion catalyst, the conversion activity of the catalyst becoming thereby impaired by the adverse action of lead thereon, which improvement comprises intermittently subjecting said catalyst to contact with a reducing atmosphere comprising the products of incomplete combustion of said leaded fuel whereby the conversion activity of the catalyst is periodically increased.

A particular embodiment of the instant invention is directed to an improvement in the catalytic conversion of lead-containing exhaust gases emanating from an internal combustion engine using leaded fuel including the steps of commingling primary air with said fuel, burning the resulting fuel-primary air mixture in said engine and converting the mixture into exhaust gases, admixing secondary air with said exhaust gases and subjecting the resultant secondary air-exhaust gas mixture to contact with a lead-sensitive conversion catalyst, the conversion activity of the catalyst becoming thereby impaired by the adverse action of lead thereon, which improvement comprises intermittently reducing the quantity of secondary air admixed with said exhaust gases while simultaneously increasing the ratio of fuel to primary air whereby to provide a rich fuel-primary air mixture which undergoes incomplete combustion to yield reducing exhaust gases and passing said reducing exhaust gases into contact with said catalyst whereby to effect periodic regeneration of the catalyst.

Another particular embodiment of this invention concerns an improvement in the catalytic conversion of lead-containing exhaust gases emanating from an internal combustion engine using leaded fuel including the steps of admixing secondary air with said exhaust gases and subjecting the resultant mixture to contact with a lead-sensitive conversion catalyst, the conversion activity of the catalyst becoming thereby impaired by the adverse action of lead thereon, which improvement comprises passing said exhaust gases without addition of secondary air thereto into a first catalyst-containing zone whereby to effect at least partial reactivation of the catalyst in said first zone, withdrawing exhaust gases from said first zone, admixing secondary air with the withdrawn exhaust gases and passing the resulting air-exhaust gas mixture into and through a second catalyst-containing zone whereby to effect conversion of said exhaust gases, discharging the resultant conversion products into the atmosphere, and periodically reversing the sequence of exhaust gas flow through said first and second zones.

Still another embodiment of the present invention provides a method of purifying lead-containing exhaust gases emanating from an internal combustion engine using leaded fuel which comprises passing said exhaust gases into contact with a conversion catalyst disposed in an elongated conversion zone, introducing a stream of secondary air into said conversion zone at one of a plurality of air injection points spaced along the length of the conversion zone, and periodically advancing the point of air introduction from one air injection to the next adjacent point.

Yet another embodiment of the present invention relates to a method of purifying lead-containing exhaust gases emanating from an internal combustion engine using leaded fuel which comprises passing said exhaust gases in admixture with secondary air into and through a first catalyst-containing zone and discharging the resultant conversion products into the atmosphere, intermittently diverting said exhaust gases from said first zone and passing the diverted exhaust gases without admixture of secondary air therewith into a second catalyst-containing zone whereby to effect at least partial reactivation of the catalyst in said second zone, withdrawing exhaust gases from said second zone, admixing secondary air with the withdrawn exhaust gases and passing the resulting air-exhaust gas mixture into and through said first catalyst-containing zone, discharging the resultant conversion products into the atmosphere, and periodically interchanging said first and second zones.

The method of the present invention and the benefits afforded through the utilization thereof will be more clearly understood by defining several of the terms employed within the specification and the appended claims. The term "catalyst" or "conversion catalyst" is intended to connote an element, compound, composite of two or more elements or compounds, or mechanical mixture of elements, compounds or composites which are employed for their catalytic activity in regard to the conversion of various waste products, particularly hydrocarbons and/or carbon monoxide. The phrase "lead-sensitive conversion catalyst" designates a catalyst the conversion activity of which is adversely affected when subjected to contact, at conversion conditions, with lead-containing waste products, and, as such, it includes all known catalysts. The terms "lead," "lead-containing" and "lead-contaminated" refer to metallic lead, lead compounds, particularly lead salts such as the sulfates and halides thereof, lead oxides, lead oxyhalides, mixtures of two or more such lead compounds, lead or lead salt-catalyst complexes, etc., since the actual form or forms in which the lead may exist in the exhaust gases or in combination with the catalyst are not definitely known and, in any event, are of no consequence to the operability of the present method.

It is understood that the instant method of catalyst regeneration is applicable to a great many catalysts, and the invention is not, therefore, to be limited to utilization or regeneration of any one catalyst or class of catalysts.

Typical conversion catalysts to which the present invention may be applied comprises one or more catalytically active metallic components which are preferably composited with a refractory inorganic oxide carrier material. Suitable catalytically active metallic components include, but are not limited to, vanadium, chromium, molybdenum, tungsten, members of the iron group and platinum group of the periodic table, copper, silver and gold. A particular metal may be used singly or in combination with any of the foregoing metals. Thus, the catalyst may comprise metals selected from groups IB, VA, VIA and VIII of the periodic table. Especially desirable catalytically active metals or combinations thereof comprise the following: platinum, palladium, other noble metals such as iridium and rhodium, iron, cobalt, nickel, chromium, copper, vanadium, tungsten, molybdenum, manganese, silver, gold, and various mixtures including copper - cobalt, copper - iron, copper - chromium, nickel-chromium, cobalt-chromium, manganese-chromium, manganese-iron, platinum-iron, platinum-cobalt, platinum-nickel, palladium-iron, palladium-cobalt, palladium-nickel, palladium - copper, palladium - platinum, palladium-copper - cobalt, platinum - copper - cobalt, copper-cobalt-nickel-palladium, platinum-palladium-cobalt, etc.

As hereinabove set forth, the catalytically active metallic component or compenents are desirably composited with a refractory inorganic oxide, the latter serving as a carrier material therefor. Although greater stability and activity are usually obtained when the refractory inorganic oxide contains at least a portion of alumina, other suitable refractory inorganic oxides may be emp'oyed including silica, boria, titania, zirconia, hafnia, and mixtures of two or more. The carrier material may be manufactured by any suitable method including separate, successive, or co-precipitation methods of manufacture. The carrier material may comprise naturally occurring substances such as clays or earths, and may or may not be activated prior to use by one or more treatments including drying, calcining, steaming, or particular treatments with inorganic and organic reagents.

The catalytically active metallic components, hereinabove set forth, may be added to the carrier material in any suitable, convenient manner. The catalytically active metallic components may be combined with the carrier material by separate, simultaneous, or successive precipitation methods, or by impregnating the carrier material with a soluble salt of the catalytically active metal. For example, when platinum is employed, it may be added to the carrier material by commingling the latter with an aqueous solution of chloroplatinic acid. Other water-soluble compounds of platinum, or of other noble metal components, may be utilized within the impregnating solution. When the catalyst is to contain other metallic components, the catalyst may be prepared by commingling soluble compounds of these components, particularly the nitrates, chlorides or carbonates, and soaking the particles of the inorganic refractory oxide therein, followed by heating to form the corresponding oxides of the metallic components. When impregnating techniques are employed, there may be one or more impregnating solutions containing one or more of the catalytically active metallic components. For example, when the catalyst is to contain both platinum and cobalt, the platinum may be impregnated within the carrier material, subsequently calcined, followed by a second impregnating technique incorporating the cobalt component. Although the precise means by which a metallic component is combined with a refractory carrier material is not known, is it believed that it exists in some physical association or chemical complex therewith. Thus, platinum may be present as a free metal, or as a chemical compound or in physical association with the carrier material, or with the other catalytically active metallic components, or in some combination with both. Many methods of preparing such catalytic composites exist and are well known in the prior art; these need not be described in detail herein since no claim is being made for any particular method of manufacturing the conversion catalyst.

The background of the present invention having been set forth, the instant regeneration technique will now be described more explicitly. After the spent catalyst has been exposed to contact with lead-containing exhaust gases under conversion conditions for a sufficient time as to become substantially deactivated, which may occur after anywhere from 1000 to 20,000 equivalent road miles of use, it becomes necessary to reactivate it, which may be accomplished by removing the catalyst from the converter and subjecting it to contact with a reducing atmosphere in external regeneration facilities, or by temporarily suspending the normal exhaust gas conversion reactions and passing reducing gases over the catalyst in situ. In a preferred method, the regeneration is effected continuously in a separate catalytic zone apart from the conversion zone and the regenerated catalyst is periodically functionally interchanged with the spent catalyst; several embodiments of this preferred conversion-regeneration technique will be amplified hereinbelow. The regenerating medium must be reducing with respect to lead and as such may comprise hydrogen, carbon monoxide, organic materials, particularly saturated hydrocarbons such as methane, ethane, propane, butanes, pentanes, gasoline boiling range hydrocarbons, naphthas, middle distillates, incompletely oxidized combustion products of a motor fuel, mixtures of two or more of these, and the like. The regenerating medium is preferably maintained in the gaseous or vapor state and is contacted with the catalytic mass at a temperature within the range from about 200° F. to about 2000° F., and preferably at a temperature within the range of about 500° F. to about 1600° F. A simple and convenient method is to pass a preheated stream of reducing gas over the catalyst particles. At higher temperatures some of the lead may be reduced to molten metallic droplets and swept free of the catalyst by entrainment with the reducing gas, and at still higher temperatures the lead may be reduced to metallic vapors and stripped free of the catalyst; however, as pointed out above, such lead removal is not necessary and is only incidental to the main purpose of the invention, which is to improve the activity of the catalyst with respect to exhaust gas conversion. The time required to effect the regeneration depends, of course, upon a number of variables such as the initial and/or equilibrium concentration of lead in the catalyst, the size and disposition of the catalyst particles, the temperature of the regeneration, and the space velocity of the regenerating gas. The preferred space velocity is within the range of 50 to 10,000 volumes of regenerating gas per volume of catalyst per hour, and more desirably in the range of 100 to 3000 volumes of regenerating gas per volume of catalyst per hour. The pressure of regeneration is not critical and may range from sub-atmospheric to 1000 p.s.i. or more; obviously, when the regeneration is effected in situ, the pressure will approximate atmospheric or be slightly above atmospheric, corresponding to the normal engine exhaust manifold pressure.

The following examples are given for the purpose of further illustrating the method of the present invention and to indicate the benefits afforded through the utilization thereof. It is not intended that the present invention be limited to the reagents, concentrations and/or conditions employed within the examples.

EXAMPLE I

A catalyst comprising 0.4% platinum on alumina was contaminated with lead by prolonged exposure to exhaust gases emanating from an internal combustion engine using leaded fuel. A portion of the leaded catalyst was divided into two samples, designated catalyst A and catalyst B in Table I below. Catalyst A was treated with a stream of hydrogen at 1500° F., and catalyst B was treated with a stream of carbon monoxide at 1500° F., under conditions shown in Table I. The activity of the untreated and treated catalysts, as well as that of fresh catalyst, was tested by measuring the ignition temperature and temperature rise obtained by passage of air containing benzene vapor, under standardized conditions, into and through an apparatus in which a bed of the catalyst was gradually heated until ignition of the benzene vapor occurred (as indicated by a temperature differential between the bed inlet and bed outlet). A small temperature rise and/or a high ignition temperature indicate a low conversion activity.

The conditions of treatment of the deactivated catalyst and a comparison of the activities of fresh catalyst and regenerated catalyst are shown in Table I.

conversion activity was increased three-fold in the case of catalyst A and five-fold in the case of catalyst B.

EXAMPLE II

An evaluation of regenerating spent catalyst by intermittent treatment, in situ, with reducing exhaust gases was accomplished by means of a particular test designed to simulate conditions which would be encountered in the actual operation of a motor vehicle. The test procedure involved the utilization of a standard dynamometer, whereby an eight-cylinder gasoline engine was loaded or driven by a motor-generator. A vertically oriented cylindrical vessel or converter, having an inside diameter of about 8″, was serially connected in the engine exhaust line so that the exhaust entered the top of the converter and flowed downwardly therethrough. The converter was loaded with a conversion catalyst comprising 0.4% platinum by weight on alumina. The catalyst, in the form of ⅛″ spheres, was loaded to a bed depth of about 6″, the bed being disposed upon a supporting screen within the converter. A second screen was arranged above the catalyst bed and a layer of ¼″ ceramic balls was placed thereon to facilitate the even distribution of the exhaust gases flowing downwardly through the bed. Means were provided for injecting secondary air into the inlet of the converter. Samples of the inlet and outlet gases entering and leaving the converter were periodically withdrawn and analyzed for hydrocarbon content by a Liston-Becker non-dispersive infrared gas analyzer employing a hexane cell detector. By difference between hydrocarbon content of inlet and outlet samples, the percent hydrocarbon conversion was thus determined at periodic intervals during the test run, and the decline in catalyst activity as a function of time readily observed therefrom. In reporting the results of the analyses performed on the exhaust gas samples, the term "hydrocarbon" connotes all hydrocarbons whether saturated, unsaturated, or partially-oxidized, as determined by the aforementioned analytical method.

The engine was first run for a period of 40 hours at 2500 r.p.m. and 41 brake horsepower, using fuel leaded with 3 milliliters of tetraethyl lead as motor mix. The air:fuel ratio, as determined by the carburetor setting, was standard (about 12.5) during this period. Secondary air was pressured into the inlet of the converter and its flow rate was held at about 20 pounds per hour. The exhaust gas conversion during the 40-hour period declined from 87% to 55%.

At this point secondary air injection was terminated and the air:fuel ratio was enriched to about 11.0. The engine was then run on a 2 minute automatic cycle (including conditions of idling, accelerating, cruising and decelerating, according to a standard, predetermined pattern) for a period of 14 hours. Secondary air was then reintroduced and the exhaust gas conversion of the catalyst was found to have been restored to 77%. Two more successive regeneration treatments, of 13 hours' and

*Table I*

| Catalyst | Weight percent lead | Activity before reactivation | | Reactivating treatment | | Weight percent lead after reactivation | Activity after reactivation | |
|---|---|---|---|---|---|---|---|---|
| | | Ignition temp., °F. | Temp. rise, °F. | Time at 1,500° F., hours | Reducing gas, cc./min. per 100 cc. catalyst | | Ignition temp., °F. | Temp. rise, °F. |
| Fresh | 0 | 325 | 450 | | | | | |
| A | 18.9 | 375 | 125 | 5 | 3,900 | 14.5 | 430 | 400 |
| B | 19 | 375 | 45 | 5 | 3,900 | 13.7 | 355 | 220 |

These results are particularly striking in view of the fact that although the reactivating treatment only reduced the lead content of the catalyst by less than 30%, yet the 22 hours' duration, improved the conversion to 85% and 94%, respectively.

The results of Example II clearly demonstrate the feasibility and utility of employing exhaust gases emanating from an internal combustion as the source of the reducing atmosphere for effecting the regeneration of a lead-contaminated catalyst.

The catalyst-regenerating ability of reducing exhaust gases may be practically implemented for vehicular applications in many ways. One of these, demonstrated by Example II, supra, involves intermittently increasing the fuel:air ratio of the fuel-air mixture charged to the engine while simultaneously reducing or cutting off the secondary air admixed with the exhaust gases in order to provide a rich fuel-air mixture which will undergo incomplete combustion in the engine and generate reducing exhaust gases. Another technique is to intermittently inject a reducing agent into the exhaust gases upstream of the catalyst bed, preferably cutting out the secondary air during such injection to avoid the possibility of temperature runaway in the catalyst bed; suitable reducing agents for this purpose are hydrogen, carbon monoxide, light hydrocarbons, gasoline, diesel oil, etc. which are readily volatilized at normal exhaust gas temperatures.

Figure 2:
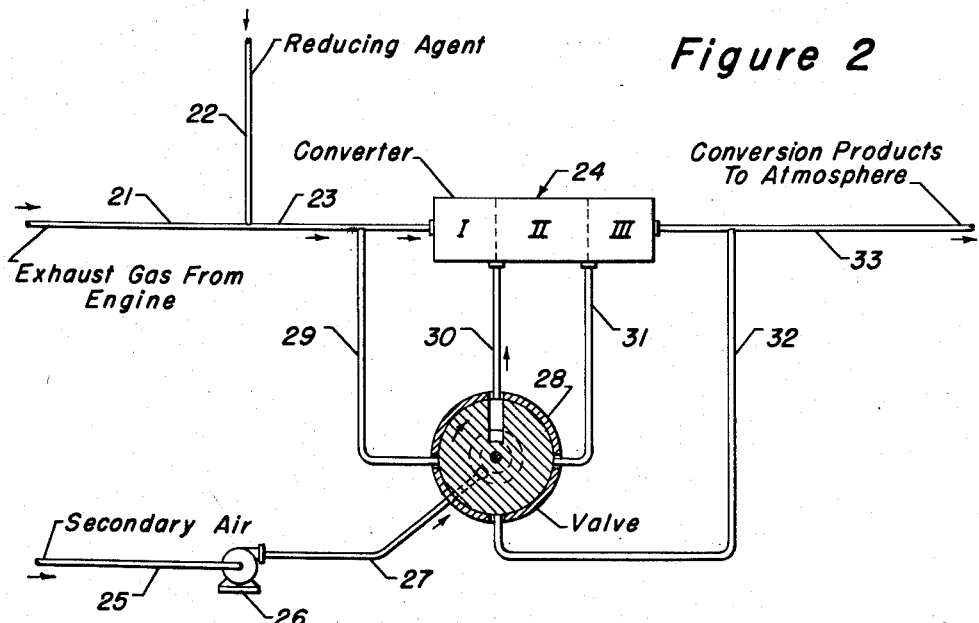

Further examples of how the invention may be utilized are shown in the schematic flow diagrams of the drawings, in which FIGURE 1 illustrates a dual zone catalytic conversion system with reversible series flow and intermediate air injection; FIGURE 2 depicts a multiple zone system with non-reversible series flow and a translatable point of air injection; and FIGURE 3 shows a "swinging" dual zone system with intermittent, non-reversible series flow and intermediate air injection. It is understood that the several processes herein set forth are given with a view of illustrating the preferred modes of practicing the invention as it relates to in situ catalyst regeneration, but are not intended to be limiting upon the broad scope of the invention.

Referring first to FIGURE 1, exhaust gases leaving the engine exhaust manifold are passed through line 1, mixed with a suitable reducing agent charged through line 2, and the exhaust gas-reducing agent mixture, which constitutes a reducing atmosphere, flows through line 3 and four-way reducing valve 4 into and through converter 14, which contains a fixed bed of catalyst particles; the catalyst in converter 14 is thus contacted with a reducing atmosphere and undergoes regeneration. Air is sucked from the outside atmosphere through line 5 by engine-driven compressor 6 and is pressured through line 7 into the exhaust gas stream leaving converter 14; the resulting air-exhaust gas mixture then flows through converter 15, also containing a fixed bed of catalyst particles, wherein catalytic conversion of the exhaust gases takes place. The resultant conversion products leaving converter 15 flow through reversing valve 4 and are discharged via line 8 to the atmosphere. When the activity of the catalyst in converter 15 has declined to a predetermined level, or after a fixed time has elapsed, reversing valve 4 is rotated 90° so that the direction of exhaust gas flow through converters 14 and 15 is reversed: converter 15 now functions as the regeneration zone and converter 14, having previously undergone regeneration, functions as the conversion zone. Letting the angular position of valve 4 as illustrated in FIGURE 1 be 0°, the following relationships obtain during an operating cycle:

| Reversing valve position | Converter 14 | Converter 15 | Flow path of exhaust gas |
|---|---|---|---|
| 0°, 180° | Regeneration | Conversion | 3-a-14-b-c-15-d-8 |
| 90°, 270° | Conversion | Regeneration | 3-d-15-c-b-14-a-8 |

Thus, as valve 4 is unidirectionally rotated through 90° increments, or, alternatively, as valve 4 is reciprocated through 90° of rotation, converters 14 and 15 are functionally interchanged. By periodically advancing the angular position of valve 4, a cyclic regenerative conversion process is achieved. Obviously, the success of this method is not dependent upon the use of a unitary reversing valve, and an equivalent network of gate valves may be employed, if desired.

Valve 4 may be manually operated from time to time, or automatically rotated at fixed intervals by a suitable timing mechanism, or automatically rotated in response to some process condition which is indicative of reduced catalytic activity of the catalyst bed presently functioning as the conversion zone. Inasmuch as the conversion reactions are exothermic and fairly adiabatic, a very convenient process condition for this purpose is temperature, either the temperature of the conversion products or, preferably, the temperature differential or rise across the complete dual zone system. Such control method is shown in FIGURE 1 wherein a temperature differential switch 9 is connected, via signal lines 10 and 11, to respond to the temperatures of the exhaust gases entering through line 1 and of the conversion products leaving through line 8, respectively. Signal lines 10 and 11 schematically represent liquid-, vapor-, or gas-filled thermal bulbs, thermocouples, or other suitable temperature sensing elements. Switch 9 contains contacts which open or close upon occurrence of a preset low differential temperature, for example a ΔT of 150° F., and energizes valve actuator 12, which may be hydraulically or electrically powered; actuator 12 moves valve 4 through a suitable linkage member 13.

The control system additionally includes suitable circuitry, such as a bi-stable relay, for rendering actuator 12 responsive to successive identical events, i.e., switch closures, and non-responsive to alternating opposite events, i.e., switch openings, or vice versa, so that the exhaust gas flow through the converters will be reversed only when the temperature differential falls below a predetermined level. It will usually be desirable to provide a shut-down lock-out switch to prevent the actuator from operating when the internal combustion engine is turned off, in which case the differential temperature necessarily decreases, as well as during a reasonable interval following engine startup. These refinements are not shown in the drawings or discussed in detail herein, as they are readily available from commercial instrumentation suppliers and may be assembled by on skilled in the art of control systems.

In the event that it is not desired to admix a reducing agent with the exhaust gases, an alternate procedure, at some sacrifice in fuel economy, is to increase the proportion of fuel in the fuel-air mixture charged to the engine above that normally employed in order to provide an abnormally rich mixture which undergoes incomplete combustion in the engine and thereby yields the requisite excess of reducing exhaust gases.

Another embodiment of the invention is shown in FIGURE 2. Exhaust gases leaving the engine exhaust manifold flow through line 21, a reducing agent is added thereto through line 22, and the exhaust gas-reducing agent mixture is charged through line 23 to converter 24, which contains an elongated fixed bed of catalyst particles. The conversion products leave converter 24 via line 23 and are thence released to the atmosphere. Secondary air is sucked from the outside atmosphere through line 25 by engine-driven compressor 26 and is passed through line 27 into rotary distributing valve 28 to which are connected air distributing conduits 29, 30, 31 and 32; conduit 29 communicates with converter inlet line 23, conduits 30 and 31 communicate with the elongated catalyst bed at points spaced along the length thereof, and conduit 32 communicates with converter outlet line 33. As valve 28 is rotated clockwise in 90° increments, secondary air is passed successively through conduits 29, 30, 31 and 32, in that order, and then the cycle is repeated. When secondary air is introduced into a conduit other than conduit 29, that portion of the catalyst bed which is upstream of the point of air injection is subjected to a reducing atmosphere and undergoes regeneration. The longitudinally spaced points of air injection divide converter 24 into a plurality of serially connected zones, in this example zones I, II and III. Letting the angular position of valve 28 as illustrated in FIGURE 2 be 0°, the following relationships obtain during an operating cycle, wherein "R" designates regeneration and "C" designates conversion:

| Reversing valve position | Air enters conduit | Zone I | Zone II | Zone III |
|---|---|---|---|---|
| 0° | 30 | R | C | C |
| 90° | 31 | R | R | C |
| 180° | 32 | R | R | R |
| 270° | 29 | C | C | C |

All portions of the catalyst bed thus undergo regeneration at some phase of the operating cycle. Assuming that valve 28 occupies each of its positions for equal time intervals, zone I undergoes regeneration 75% of the time; zone II, 50% of the time; and zone III, 25% of the time. To compensate for the non-uniformity of the ratio of conversion time to regeneration time as between the several zones, it may be desirable to provide progressively larger volumes of catalyst in zones I, II and III, in that order, so that the time-average space velocity during conversion for each zone varies inversely with the total time such zone is employed for conversion; thus, in FIGURE 2, zone II would contain twice the volume of catalyst in zone I, and zone III would contain three times the volume of catalyst in zone I.

A particular advantage of moving the point of air injection is that a reversing valve is not required in the exhaust gas-handling portion of the system, and the attendant problems of pressure drop and high temperature valve construction are avoided; only a relatively small fluid distributing valve is needed (or equivalent individual gate valves), and this may be constructed of brass, aluminum, cast iron or other inexpensive materials commonly employed in valves for low temperature, non-corrosive service. An apparent disadvantage of this method is that during a portion of the operating cycle, all of the catalytic zones are undergoing regeneration, and none are converting exhaust gases, as, for example, when air is introduced into conduit 32 of FIGURE 2. However, some thermal conversion may be expected to occur in conduit 33; and, in any event, the loss in conversion may be minimized by providing a greater number of air distributing conduits, and, correspondingly, a greater number of conversion zones.

Addition of a reducing agent may be omitted, if desired, provided that the exhaust gases are already sufficiently reducing in nature. Valve 28 may be operated manually or automatically, as in the embodiment of FIGURE 1.

It is a characteristic of internal combustion engines, particularly those engines whose fuel supply is deried from one or more carburetors feeding a bank of cylinders, that the intake manifold pressure will vary with engine speed and also with rate of change of speed; and the lowest intake manifold pressure, or highest vacuum, will obtain when the engine is decelerating. Such characteristic follows from the fact that the throttle is at or near its idle position, resulting in minimum fuel flow, while the pistons and intake valves are still moving at a high velocity and hence tend to act as a vacuum pump on the intake system. For example, when an internal combustion engine is operated under conditions of idling, accelerating or cruising, the intake manifold vacuum is typically in the range of 0″ Hg to 20″ Hg, but when decelerating, the vacuum increases above 20″ Hg, usually in the range of 21″–26″ Hg. It is a further characteristic of such engine that the concentration of hydrocarbons and carbon monoxide in the exhaust gases during deceleration is many-fold their concentration during other conditions; exhaust gases produced during engine deceleration are rich in unburned fuel and in products of incomplete combustion and are thus strongly reducing. As a consequence, intake manifold pressure is a simple and unique criterion of the existence of reducing exhaust gases necessary for catalyst regeneration, the minimum pressure which is incident to engine deceleration therefore corresponding to the generation of strongly reducing exhaust gases.

The foregoing relationship is utilized to advantage in the embodiment of FIGURE 3, which provides two interchangeable catalytic conversion zones with intermittent regeneration of the catalyst in either of them. Exhaust gases leaving the engine exhaust manifold flow through line 41 and encounter two alternate flow paths: one of these is through a normally-open (NO) motor valve 42 during non-regenerative periods, and the other through a normally-closed (NC) motor valve 43 during regeneration periods. The servo-actuators of valves 42 and 43, which may be diaphragm- or solenoid-operated, are connected in tandem to signal line 44 which connects directly with the engine intake manifold or indirectly therewith through a suitable transducer. At normal intake manifold pressures, corresponding to non-deceleration conditions, valve 42 is open and valve 43 is closed. The exhaust gases flow through valve 42, through bypass line 45, and air injector or aspirator 46, causing secondary air to be injected into the exhaust gas stream via line 47. The resulting air-exhaust gas mixture flows through reversing valve 48 and converter 52, wherein conversion of the exhaust gases is effected, and the conversion products are discharged to the atmosphere through reversing valve 49 and line 50. During this period, converter 51 is completely bypassed.

Upon the intermittent occurrence of a predetermined minimum intake manifold pressure, correlative with deceleration and generation of strongly reducing exhaust gases, valve 42 closes and valve 43 opens so that converter 51 is connected in series with converter 52 upstream of the point of air injection. Now the exhaust gases pass through valve 43, reversing valve 48, and converter 51 wherein regeneration of the catalyst takes place; exhaust gases leaving converter 51 pass through reversing valve 49 and then through injector 46, causing secondary air to be injected into the exhaust gas stream via line 47. The resulting air-exhaust gas mixture then flows through reversing valve 48 and converter 52, wherein conversion of the exhaust gases is effected and the conversion products are released to the atmosphere through reversing valve 49 and line 50.

When the activity of the catalyst in converter 52 has declined to a predetermined level, or after a fixed time has elapsed, reversing valves 48 and 49 are simultaneously rotated 90° so that converters 51 and 52 are interchanged; the catalyst in converter 52 now undergoes intermittent regeneration and the catalyst in converter 51, having previously undergone regeneration, now functions continuously as the conversion zone. Reversing valves 48 and 49 may be independently rotated in unison, or may be ganged together or mounted on a common shaft, or may be unitized in an integral rotor-stator combination. Letting the angular position of valves 48 and 49, as illustrated in FIGURE 3 be 0°, the following relationships obtain during an operating cycle:

| Position of reversing valves | Converter 51 | Converter 52 | Flow path of exhaust gas |
|---|---|---|---|
| 0°, 180° | Bypassed | Conversion | a-42-d-c-52-f-50. |
|  | Regeneration | do | a-43-b-51-c-d-e-52-f-50. |
| 90°, 270° | Conversion | Bypassed | a-42-d-51-c-50. |
|  | do | Regeneration | a-43-c-52-f-d-b-51-c-50 |

Thus, as reversing valves 48 and 49 are unidirectionally rotated through 90° increments, or, alternatively, as valves 48 and 49 are reciprocated through 90° of rotation, converters 51 and 52 are functionally interchanged.

By periodically advancing the angular position of valves 48 and 49, a cyclic regenerative conversion process is achieved. The reversing valves may be manually operated from time to time, or automatically rotated at fixed intervals by a suitable timing mechanism, or automatically rotated in response to some process condition which is indicative of reduced catalytic activity of the catalyst bed presently functioning as the conversion zone, for example, by a differential temperature control system such as illustrated in the embodiment of FIGURE 1.

The advantages of the embodiment of FIGURE 3 are that regeneration is effected only intermittently, during engine deceleration, when large quantities of reducing exhaust gases are available for this purpose; addition of a reducing agent to the exhaust gases is not necessary, and the engine may be tuned to peak performance with respect to maximum fuel economy. Since one of the converters is bypassed during non-regeneration periods, the system pressure drop is minimized during those operating conditions, especially accelerating and cruising, when attainment of low exhaust manifold pressure is important for optimum engine performance. Furthermore, the direction of exhaust gas flow through all elements of the system is at all times unidirectional, so that it is feasible to employ an exhaust gas-motivated air injector for supplying secondary air, rather than an auxiliary powered air compressor as is required when reversing flows are involved; and, further, problems attendant on flow reversal through fixed beds, such as fluidization of the bed during upflow with resultant accelerated attrition of the catalyst, are avoided.

I claim as my invention:

1. A method of regenerating a deactivated solid oxidation catalyst contaminated with from about 5% to about 30% by weight of lead which comprises subjecting said catalyst, at a temperature within the range of about 200° F. to about 2000° F., to contact with a reducing gas for a sufficient time to reactivate the catalyst.

2. A method of regenerating a deactivated solid oxidation catalyst contaminated with from about 5% to about 30% by weight of lead which comprises subjecting said catalyst, at a temperature within the range of about 500° F. to about 1600° F., to contact with a reducing gas for a sufficient time to reactivate the catalyst.

3. The method of claim 2 further characterized in that said reducing gas comprises hydrogen.

4. The method of claim 2 further characterized in that said reducing gas comprises carbon monoxide.

5. The method of claim 2 further characterized in that said reducing gas comprises an organic compound.

6. The method of claim 5 further characterized in that said organic compound is a hydrocarbon.

7. The method of claim 2 further characterized in that said reducing gas comprises the products of incomplete combustion of a motor fuel.

8. In the catalytic oxidation of lead-containing exhaust gases emanating from an internal combustion engine using leaded fuel including the steps of admixing secondary air with said exhaust gases and subjecting the resultant mixture to contact with a solid oxidation catalyst, the oxidizing activity of the catalyst becoming thereby impaired by the adverse action of lead thereon, the improvement which comprises intermittently subjecting said catalyst, after it has become contaminated with from about 5% to about 30% by weight of lead, to contact with a reducing atmosphere comprising the products of incomplete combustion of said leaded fuel for a sufficient time to reactivate the catalyst.

9. In the catalytic oxidation of lead-containing exhaust gases emanating from an internal combustion engine using leaded fuel including the steps of commingling primary air with said fuel, burning the resulting fuel-primary air mixture in said engine and converting the mixture into exhaust gases, admixing secondary air with said exhaust gases and subjecting the resultant secondary air-exhaust gas mixture to contact with a solid oxidation catalyst, the oxidizing activity of the catalyst becoming thereby impaired by the adverse action of lead thereon, the improvement which comprises intermittently reducing the quantity of secondary air admixed with said exhaust gases while simultaneously increasing the ratio of fuel to primary air whereby to provide a rich fuel-primary air mixture which undergoes incomplete combustion to yield reducing exhaust gases and passing said reducing exhaust gases into contact with said catalyst, after it has become contaminated with from about 5% to about 30% by weight of lead, for a sufficient time to effect periodic regeneration of the catalyst.

10. In the catalytic oxidation of lead-containing exhaust gases emanating from an internal combustion engine using leaded fuel including the steps of admixing secondary air with said exhaust gases and subjecting the resultant mixture to contact with a solid oxidation catalyst, the oxidizing activity of the catalyst becoming thereby impaired by the adverse action of lead thereon, the improvement which comprises passing said exhaust gases without addition of secondary air thereto into a first zone containing oxidation catalyst contaminated with from about 5% to about 30% by weight of lead for a sufficient time to effect at least partial reactivation of the catalyst in said first zone, withdrawing exhaust gases fom said first zone, admixing secondary air with the withdrawn exhaust gases and passing the resulting air-exhaust gas mixture into and through a second zone containing active oxidation catalyst whereby to effect oxidation of said exhaust gases, discharging the resultant oxidation products into the atmosphere, and periodically reversing the sequence of exhaust gas flow through said first and second zones.

11. In the catalytic oxidation of lead-containing exhaust gases emanating from an internal combustion engine using leaded fuel including the steps of admixing secondary air with said exhaust gases and subjecting the resultant mixture to contact with a solid oxidation catalyst, the oxidizing activity of the catalyst becoming thereby impaired by the adverse action of lead thereon, the improvement which comprises passing said exhaust gases without addition of secondary air thereto into and through a first zone containing oxidation catalyst contaminated with from about 5% to about 30% by weight of lead for a sufficient time to effect at least partial reactivation of the catalyst in said first zone, admixing secondary air with effluent leaving said first zone and passing the resulting air-effluent mixture into and through a second zone containing active oxidation catalyst whereby to effect oxidation of said effluent, discharging the resultant oxidation products into the atmosphere, and reversing the sequence of exhaust gas flow through said first and second zones when the conversion activity of the catalyst in said second zone falls below a predetermined level.

12. The method of claim 11 further characterized in that a hydrocarbon is admixed with said exhaust gases prior to passing the latter through said first zone.

13. The method of claim 11 further characterized in that the reversal of exhaust gas flow through said first and second zones is effected in response to the temperature of said oxidation products.

14. The method of claim 13 further characterized in that the reversal of exhaust gas flow through said first and second zones is effected in response to low temperature differential between the temperature of the exhaust gases entering said first zone and the temperature of said oxidation products.

15. A method of purifying lead-containing exhaust gases emanating from an internal combustion engine using leaded fuel which comprises passing said exhaust gases longitudinally through an elongated bed of solid oxidation catalyst, introducing a stream of secondary air into said catalyst bed at one of a plurality of air injection points spaced along the length of the bed, and periodically advancing the point of air introduction from one air injection point to the next adjacent point in the direction of flow of the exhaust gases through the catalyst bed.

16. A method of purifying lead-containing exhaust gases emanating from an internal combustion engine using leaded fuel which comprises passing said exhaust gases in admixture with secondary air into and through a first zone containing active oxidation catalyst and discharging the resultant oxidation products into the atmosphere, intermittently diverting said exhaust gases from said first zone and passing the diverted exhaust gases without admixture of secondary air therewith into a second zone containing oxidation catalyst contaminated with from about 5% to about 30% by weight of lead for a sufficient time to effect at least partial reactivation of the catalyst in said second zone, withdrawing exhaust gases from said second zone, admixing secondary air with the withdrawn exhaust gases and passing the resulting air-exhaust gas mixture into and through said first catalyst-containing zone, discharging the resultant oxidation products into the atmosphere, and periodically interchanging said first and second zones.

17. A method of purifying lead-containing exhaust gases emanating from an internal combustion engine using leaded fuel supplied through an intake manifold of the engine, said engine being operated at variable speed and an operating characteristic thereof being that minimum intake manifold pressure is attained when the engine is decelerating, such condition of deceleration resulting in the generation of exhaust gases rich in incompletely burned fuel, which method comprises passing said exhaust gases in admixture with second air into and through a first zone containing active oxidation catalyst and discharging the resultant oxidation products into the atmosphere, diverting said exhaust gases from said first zone in response to minimum intake manifold pressure incident to engine deceleration, passing the diverted exhaust gases without admixture of secondary air therewith into a second zone containing oxidation catalyst contaminated with from about 5% to about 30% by weight of lead for a sufficient time to effect at least partial reactivation of the catalyst in said second zone, withdrawing exhaust gases from said second zone, admixing secondary air with the withdrawn exhaust gases and passing the resulting air-exhaust gas mixture into and through said first catalyst-containing zone, discharging the resultant oxidation products into the atmosphere, and periodically interchanging said first and second zones.

18. The method of claim 17 further characterized in that the interchanging of said first and second zones is effected in response to low temperature differential between the temperature of the exhaust gases leaving said engine and the temperature of said conversion products.

References Cited in the file of this patent

UNITED STATES PATENTS 2,772,147    Bowen III et al.          Nov. 27, 1956

FOREIGN PATENTS 411,377    Great Britain             June 7, 1934